United States Patent [19]

Pemsler et al.

[11] 4,005,173
[45] Jan. 25, 1977

[54] STEAM STRIPPING OF AMMONIACAL SOLUTIONS AND SIMULTANEOUS LOADING OF METAL VALUES BY ORGANIC ACIDS

[75] Inventors: J. Paul Pemsler, Lexington; John K. Litchfield, Bedford, both of Mass.

[73] Assignee: Kennecott Copper Corporation, New York, N.Y.

[22] Filed: Mar. 3, 1975

[21] Appl. No.: 554,416

[52] U.S. Cl. .................................. 423/24; 423/32; 423/53; 423/139; 423/150; 75/101 BE
[51] Int. Cl.$^2$ .................... C01G 3/00; C01G 51/00; C01G 53/00
[58] Field of Search .............. 423/24, 139, 32, 150, 423/55, 53; 75/101 BE

[56] References Cited
UNITED STATES PATENTS

| | | |
|---|---|---|
| 3,666,446 | 5/1972 | Cook et al. .................. 75/101 BE |
| 3,718,458 | 2/1973 | Ritcey et al. .................. 423/139 X |

OTHER PUBLICATIONS

Burger *Organic Reagents in Metal Analysis* Pergamon Press, Oxford, p. 69.
Fletcher et al. "Naphthenic Acid as a Liquid–Liquid Extraction Reagent for Metals" Inst. Mining & Metallurgy, England pp. 355–366 (1961).
Boldt et al., *The Winning of Nickel*, Longmans Canada Ltd. 1967 pp. 434, 435.

*Primary Examiner*—Oscar R. Vertiz
*Assistant Examiner*—Brian E. Hearn
*Attorney, Agent, or Firm*—John L. Sniado; Lowell H. McCarter; Anthony M. Lorusso

[57] ABSTRACT

Organic acids are added to ammoniacal leach liquors containing base metals such as copper, nickel and cobalt. Ammonia and carbon dioxide are then stripped from the leach liquor by heating the leach liquor sufficiently to drive off the ammonia and carbon dioxide. The resulting loss of ammonia and carbon dioxide causes the pH of the leach liquor to drop and enables the metal values to load onto the organic acid. Metal values are selectively stripped from the loaded organic acid.

18 Claims, 1 Drawing Figure

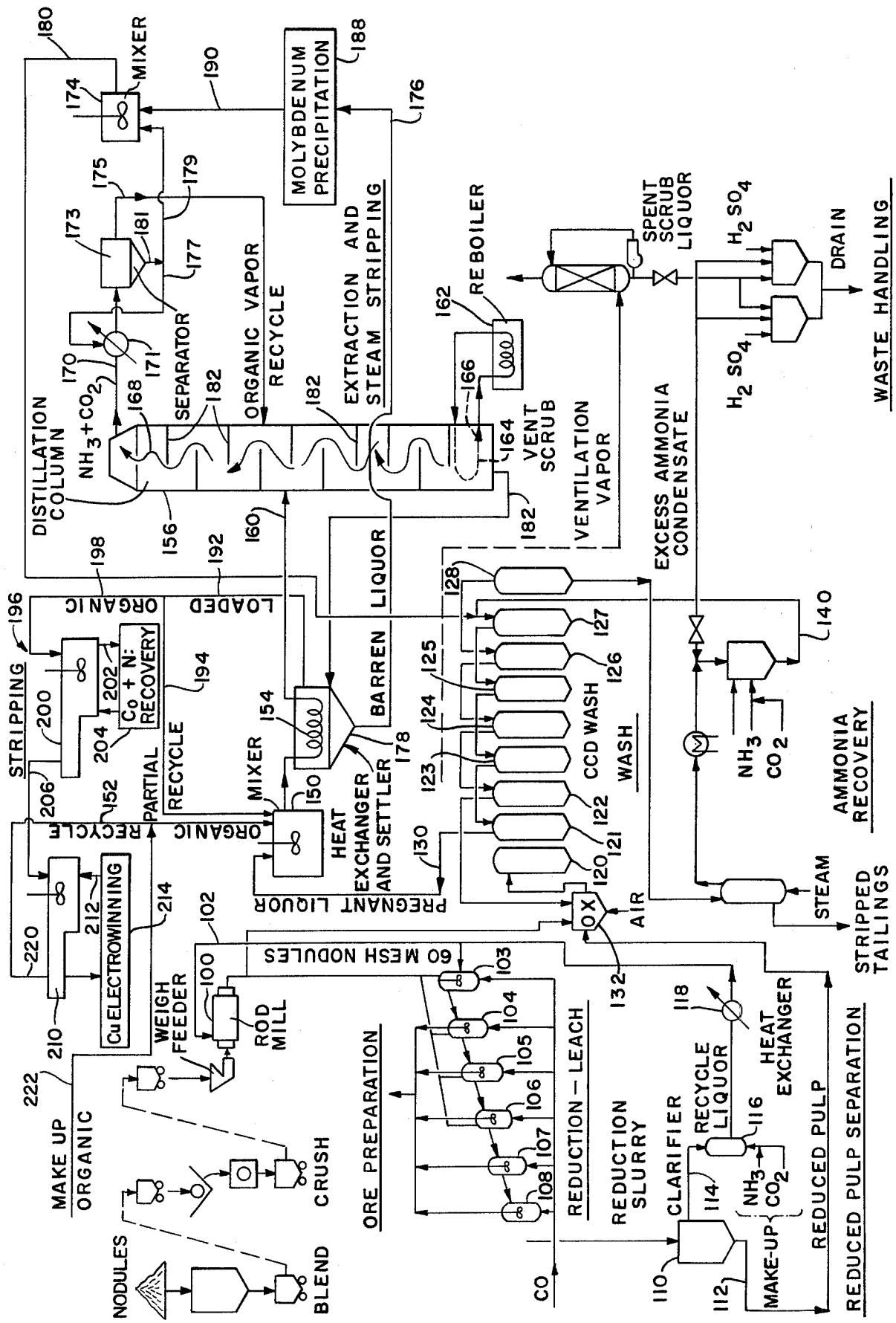

STEAM STRIPPING OF AMMONIACAL SOLUTIONS AND SIMULTANEOUS LOADING OF METAL VALUES BY ORGANIC ACIDS

BACKGROUND OF THE INVENTION

There are many processes for leaching base metals such as copper and nickel with ammoniacal leach liquors. An example of such a process is the so called, "Cuprion Process" which is disclosed in U.S. patent application Ser. No. 311,063 now abandoned entitled Recovery of Metal Values from Manganese Deep Sea Nodules, filed Dec. 1, 1972, the teachings of which are incorporated herein by reference. The disclosure of patent application Ser. No. 311,063 now appears in U.S. patent application Ser. No. 548,430 filed Feb. 10, 1975 which is a continuation-in-part of application Ser. No. 311,063.

When ores such as manganese nodules are leached in an ammoniacal solution, it is desirable to recover the carbon dioxide and ammonia from the leach liquor. A common method for recovering carbon dioxide and ammonia is to steam strip the aqueous raffinate. However, a disadvantage of steam stripping is that if it is done with metal values in the aqueous phase, the metals precipitate. Furthermore, such precipitates are considered troublesome to process further.

The present invention utilizes organic acids to extract the metals from the leach liquor. In the past organic acid liquid ion exchangers have not been useful for the extraction of copper, nickel, cobalt and similar metals from ammoniacal solution for several reasons. Firstly, the solubility of these acids becomes appreciable in alkaline media. Secondly, with metals such as copper bound in ammoniacal complexes, the strength of the complex is such that the organic cannot load the metal ion.

SUMMARY OF THE INVENTION

In accordance with the present invention, ammoniacal leach liquors containing metal values to be recovered are treated by adding an organic acid to the leach liquor and then driving off essentially all the ammonia and carbon dioxide from the leach liquor. The removal of ammonia and carbon dioxide lowers the pH to a point where the organic acid is insoluble in the aqueous phase and is capable of extracting metal values from the aqueous phase. By following the foregoing method, the organic acids are recyclable and there are no metal precipitates. Furthermore, the ammonia and carbon dioxide which are driven off from the aqueous phase can be recycled.

Accordingly, it is an object of the present invention to provide a process for treating ammoniacal leach liquors containing metal values in which the ammonia and carbon dioxide are steam stripped and recycled without metal values being precipitated from the leach liquor.

Another object of the present invention is to provide a process in which ammoniacal leach liquors are treated by driving off the ammonia and carbon dioxide and simultaneously extracting metal values with an organic acid as the ammonia and carbon dioxide are driven off.

BRIEF DESCRIPTION OF THE DRAWING

The sole FIGURE of the drawing is a flow sheet illustrating the process of the present invention.

DESCRIPTION OF THE PREFERRED EMBODIMENTS

At the outset the process of the present invention is described in its broadest overall aspects with a more detailed description following. The present invention involves treating ammoniacal leach liquors containing base metal values to recover the base metals and includes heating the leach liquor to drive off the ammonia and carbon dioxide for re-use and simultaneously extracting the base metal values.

The present invention involves the use of an organic acid as an extractant for the metal values in the leach liquor. Organic acids which are useable in accordance with the present invention include carboxylic acids and organophosphoric acids.

The carboxylic acid compounds which are usable include, by way of example and not by way of limitation, naphthenic acid, pelargonic acid, 2,2-dimethyl propionic acid, caproic acid, butyric acid and 3,5-dinitro benzoic acid.

Naphthenic acid is a name given to a group of aliphatic monocarboxylic acids having the general structure

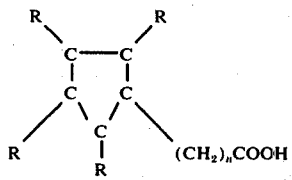

The acids are produced from crude petroleum, and have a molecular weight range of about 170–330.

A carboxylic acid extractant that can be used to great advantage in the process of the present invention is an organic acid sold under the trade name "Versatic" 911. Versatic 911 acid is a Shell Chemical Company trademark for a saturated synthetic tertiary monocarboxylic acid having $C_9$, $C_{10}$ and $C_{11}$ chain length.

Versatic 9, Versatic 10, and Versatic 1519 acids have $C_9$, $C_{10}$ and $C_{15}$ to $C_{19}$ carbon chain lengths respectively. They are made from olefins, water and carbon monoxide in the presence of a strong acid catalyst.

The general structure for versatic acids are:

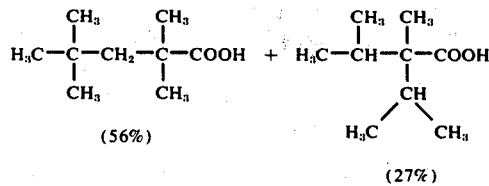

Versatic 9

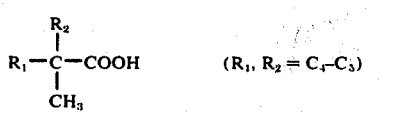

Versatic 911 and similar structures for Versatic 10, 13, 1519 and SRS-100.

Another carboxylic acid that can be employed in the present invention is α-bromolauric acid. This reagent has the structure:

$CH_3(CH_2)_9CH(Br)COOH$.

The organo phosphorous compounds which can be utilized include acid compounds of the following formula:

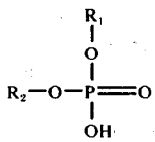

where $R_1$ and $R_2$ are selected from the group consisting of alkyl, aryl, and aralkyl radicals. Since the compound must be substantially water-immiscible, the total number of carbon atoms in the molecule should be sufficient to render the compound substantially insoluble. Generally at least 4–20 carbon atoms should be present on each R group. $R_1$ and $R_2$ can be the same radical. The $R_1$ and $R_2$ groups can, of course, be substituted with a variety of groups such as alkoxy hologen, etc., and $R_1$ and $R_2$ can be saturated or unsaturated or interrupted by hetero atoms so long as there is no interference in the performance of the compound in extracting ions from the aqueous phase to the organic phase.

Organophosphoric acid compounds which can be advantageously used according to this di(include di-(2-ethylhexyl) phosphoric acid, heptadecylphosphoric acid, dodecylphosphoric acid, di(1-methyl-heptyl) phosphoric acid, diisooctylphosphoric acid, di(2-ethyl-4-methyl-pentyl) phosphoric acid, di(2-propyl-4-methyl-pentyl) phosphoric acid, octylphenyl phosphoric acid, the isooctyl or stearyl derivatives of alkyl acid phosphates and the like.

The ion extractants used in the practice of the present invention may be employed at full strength or in an inert diluent, although the use of such diluent is not critical.

A wide variety of organic diluents, in which the ion extractant is dissolved, can be employed according to this invention. The minimum requirements for the diluent, however, are that the diluent be substantially water-immiscible, that it will dissolve the ion extractant, and that it will not interfere with the function of the ion extractant in extracting values from aqueous solutions. These diluents can be aliphatic or aromatic hydrocarbons, halogenated hydrocarbons, petroleum derivatives, ethers, etc. Examples of these various diluents include toluene, carbon tetra-chloride, benzene, chloroform, 2-ethyl-hexanol, and particularly kerosene.

In broad terms, the process of the present invention involves mixing the organic acid extractant with the leach liquor and then driving off the ammonia and carbon dioxide from the leach liquor while it is still in contact with the extractant. The acids that are used in the present invention do not degrade when subjected to steam stripping. In connection with this point, it should be noted that typical extractants used to treat ammoniacal leach liquors, such as oximes, would degrade when subjected to steam stripping. As the ammonia and carbon dioxide are removed from the aqueous ammoniacal leach liquor, the pH drops and the phases separate. That is, the organic acid, which is initially soluble in the basic ammoniacal leach liquor, becomes insoluble when the pH reaches about 8.0. As the organic separates from the aqueous, the metal ions in the aqueous are loaded onto the organic. With the organic acid loaded with metal ions such as copper, nickel and cobalt, etc., the loaded organic is selectively stripped to separate the metals from each other.

The process of the present invention is further illustrated by the following non-limiting examples. To test the process of the present invention, a synthetic leach liquor was prepared. The synthetic leach liquor had a cupric ion concentration of 9.46 g/l, a nickel ion concentration of 13.81 g/l, and a cobalt concentration of 0.52 g/l. This solution had an ammonia concentration in the order of 100 g/l and a carbon dioxide concentration of 31 g/l. Upon steam stripping in the presence of an equal volume of organic consisting of Versatic 911 acid at about 30 volume concentration in kerosene, substantially complete extraction of the metal values into the organic phase was obtained. Substantially all the carbon dioxide and ammonia was removed.

As a result of extraction and simultaneous steam stripping, the raffinate concentration of copper was 0.038 g/l, nickel was 0.036 g/l and cobalt was 0.040 g/l. The loaded organic was stripped readily with acid. Separation of copper from nickel and cobalt can be affected readily by adjusting the pH of the stripping solution so that its final pH is about 5. This will strip nickel and cobalt from the organic which will remain loaded with copper. If the pH is reduced to a value of about 1.5 or below, the copper is effectively stripped from the organic. The cobalt and nickel can be separated by any of a number of processes which may include those practiced by Sherrit Gordon Mines Ltd of Canada such as the Nickel Preferrential Reduction Process or the Soluble Cobaltic Ammine Process as reported in *Extractive Metallurgy of Copper, Nickel and Cobalt* edited by P. Queneau, Interscience Publishers, Inc., New York 1961, in an article by V. N. Mackiw and T. W. Benz, "Application of Pressure Hydrometallurgy to the Production of Metallic Cobalt", pp 503–534. The cobalt and nickel can be separated by the procedure set forth in U.S. Pat. No. 3,767,762 to Kunda entitled "Recovery and Separation of Nickel and Cobalt from Reduced Laterite Nickel Ore", or by the process set forth in U.S. Pat. No. 3,276,863 to Drobnick et al, entitled "Separation of Nickel and Cobalt Values Using α-Hydroxy Oximes." The teachings of the foregoing publications are incorporated herein by reference.

As is set forth above, the process of the present invention is generally applicable to treating any ammoniacal leach liquor containing base metal values. It is, however, specifically applicable to processing metal values leached from deep sea manganese nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea, John L. Mero, Elsevier Oceanography Series, Elsevier Publishing Company, 1965, discusses on pages 127–241 various aspects of manganese nodules. For a detailed chemical analysis of nodules from the Pacific Ocean see pages 449–450 in The Encyclopedia of Oceanography, edited by R. W. Fairbridge, Reinhold Publishing Corp., N.Y. 1966, and U.S. Pat. No. 3,169,856. For the purposes of this invention the complex ores will be considered as containing the following approximate metal content range on a dry basis:

| METAL CONTENT ANALYSIS RANGE | |
| --- | --- |
| Copper | 0.8 – 1.8% |
| Nickel | 1.0 – 2.0% |
| Cobalt | 0.1 – 0.5% |
| Molybdenum | 0.03 – 0.1% |
| Manganese | 10.0 – 40.0% |
| Iron | 4.0 – 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper and nickel are emphasized because, from an economic standpoint, they are the most significant metals in most of the ocean floor ores.

In patent application Ser. No. 311,063 now abandoned entitled "Recovery of Metal Values from Manganese Deep Sea Nodules", filed on Dec. 1, 1972, by Lester J. Szabo, the teachings of which are incorporated herein by reference, a process is disclosed in which copper, nickel, cobalt and molybdenum are recovered from raw manganese nodules with an aqueous ammoniacal leach solution containing cuprous ions. The process disclosed in application Ser. No. 311,063 is a significant breakthrough in the metallurgical art in that it significantly expends the world's source of copper, nickel, cobalt and molybdenum and has come to be called the "Cuprion process". The disclosure of patent application Ser. No. 311,063 now appears in U.S. patent application Ser. No. 548,430 filed Feb. 10, 1975 which is a continuation-in-part of application Ser. No. 311,063. The Cuprion process includes the step of contacting ground manganese nodules with an ammoniacal leach solution containing cuprous ions in a reaction vessel to reduce the manganese oxides in the nodules to enable metal values such as copper, nickel, cobalt and molybdenum to be solubilized. The nodule residue is washed with an ammoniacal ammonium carbonate solution to remove these entrained metal values from the residue and produce a pregnant liquor. To maintain a sufficient amount of cuprous ions, a reducing gas, such as carbon monoxide, is passed through the reaction vessels.

The pregnant liquor contains various metal values including copper, nickel, cobalt and molybdenum. In the liquid ion exchange separation circuit, the object is to separate the copper, nickel, cobalt and molybdenum from each other and from the pregnant liquor. In prior practice, initially, the copper and nickel are co-extracted by an organic extractant in a series of mixer/settler units. The copper and nickel free liquor (raffinate) is sent to a storage tank before it is steam stripped to recover ammonia and carbon dioxide.

The organic extractant which contains copper and nickel values is washed with an $NH_4HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/l) $H_2SO_4$ solution. The copper and nickel free organic extractant is recycled to the metal extraction circuit of the LIX process.

The raffinate which contains only cobalt, molybdenum and some trace impurities that were not extracted into the organic phase is sent into a surge tank for future processing to recover cobalt and molybdenum. In the cobalt and molybdenum recovery circuit, the ammonia and $CO_2$ are stripped from the raffinate thereby precipitating cobalt. The ammonia and $CO_2$ are condensed and sent back to the process for recycling. The cobalt precipitate is separated from the liquor and the liquor is subsequently treated with hydrated lime to precipitate the molybdenum. The resulting slurry is agitated and then allowed to settle. The solution which no longer contains cobalt and molybdenum is recycled back to the process as fresh wash liquor.

The Cuprion process embodiment of the present invention is different from the prior art Cuprion process in that the leach liquor is contacted with an organic acid extractant to extract the copper, nickel and cobalt. The leach liquor is then steam stripped to remove ammonia and carbon dioxide. The molybdenum remains in the raffinate and is easily recovered once the other metals are separated from it. The copper, nickel and cobalt which are co-loaded on the organic acid are selectively stripped therefrom.

The "Cuprion" embodiment of the present invention is illustrated by the following example in conjunction with the sole FIGURE of the drawing. At the outset, however, it is emphasized that the following description relates to a procedure that can be performed in a pilot plant. By extrapolating the results given for the pivot plant, however, one skilled in this art can design a commercial plant for processing large quantities of nodules in accordance with the present invention.

The pilot plant was designed for ½ tons per day nodule throughput, based on a 3½ percent solid slurry and with up to a 3 hour hold-up in the reduction section.

The process performed in the pilot plant can be broken down in the following sections:
1. Ore Preparation
2. Reduction-Leach
3. Extraction and Steam Stripping
4. Stripping of the Metals
5. Electrowinning

ORE PREPARATION

The nodules utilized in the pilot plant process are received in 55 gallon drums in the condition that they are in after being mined from the deep sea ocean bottom. To facilitate processing in the pilot plant, the nodules are air dried. After they are dried, they are then blended, using the "cone and quarter" technique before going into the primary crushing circuit. The primary crushing circuit consists of a Jacobson "Full Nelson" crusher to reduce the raw nodules to minus 1 inch. Thereafter, the nodules are passed through a Stedman double row cage mill to reduce the ore further to minus 6 mesh. The nodules are then conveyed away on a belt feeder to drums for storage or further processing.

The second grinding circuit is the final stage of ore preparation before the nodules enter the reduction stage. This circuit consists of a hopper, filled from the drums of cage milled ore, located on top of a hydraulic weigh feeder. The weigh feeder is used to meter nodules at a given rate into an open circuit rod mill 100 for final grinding. The rod mill reduces the nodules from a particle size of minus six mesh to a particle size of approximately minus 60 mesh. As the nodules enter the rod mill, they are wetted with a synthetic sea water which brings the nodules up to approximately 40% moisture. This moisture content corresponds to the moisture which would be present in nodules as they are brought up from the sea bottom. At this point, it should be noted that in commercial operation the nodules would be processed directly after being mined from the ocean bottom; thus, the foregoing steps of drying and wetting the nodules would be unnecessary. However, for purposes of a pilot plant operation it was found convenient to air dry the nodules and later wet the nodules so that they had a moisture content equivalent to that of freshly mined nodules.

It has been found advantageous to add recycle reduction liquor 102 to the rod mill 100. In a commercial process recycle liquor can be added to the grinding mill in order to provide a liquor to facilitate grinding and reduce the dust problem without introducing more water into the circuit which would cause undesirable dilution. Of course, the recycle reduction liquor is advantageous in maintaining the proper copper concentration in the reduction circuit as well to provide liquor which is useful in the grinding process itself. Details of the recycle liquor circuit are amplified below.

REDUCTION-LEACH

The reduction-leach portion of the pilot plant is the location where the nodules are chemically reacted to make the metals of interest soluble in a strong ammoniacal ammonium carbonate solution. This is accomplished by reducing and converting the $MnO_2$ in the nodules to $MnCO_3$.

After leaving the rod mill, the nodules are passed through a conduit into a vibrator (not shown). The purpose of the vibrator is to remove any tramp material. The vibrator utilized is a Sweco vibrating screen. The material that enters and leaves the vibrator is actually a liquid slurry. Connected to the vibrator is a surge tank (not shown). The purpose of the surge tank is to serve as a storage unit so that the process plant will not have to be shut down in the event that there is a malfunction in some piece of ore preparation machinery. After leaving the surge tank, a feed pump pumps the slurry to the reduction-leach circuit.

The reduction circuit includes six reactors 103–108 connected in series. These reactors are sixty gallon capacity reactors which are used to a 42 gallon capacity in the actual processing. Each reactor is formed of 316 stainless steel and is outfitted with an agitator, pressure gage, level alarm, and gas sparging equipment.

Gas sparging is directed underneath the agitator from the bottom of the reactor where a reduction gas containing 95 percent carbon monoxide and 5 percent hydrogen is introduced. This mixture is used because it is similar to a reduction gas mixture that is available in commercial quantities. Of course, hydrogen is unnecessary in the process. Indeed, the only gas necessary for the process is carbon monoxide. The off gas coming out of the reactors first goes through condensers which remove some of the water in the gases before going to off gas rotometers which gave an indication of the amount of gases coming out of a reactor. The off gases go through an ammonia scrubber and are exited to the atmosphere.

The reactors themselves are outfitted with gravity overflows so that there is a cascading system from the first through the sixth reactor.

In one important embodiment of the invention, each of the first four reactors (103–106) is fed an equal amount of feed stock. That is, 25 percent of the slurry being pumped from the ore preparation circuit will go into each of the first four reactors. It should be noted, however, that there are a large number of possible ways of accomplishing multipoint injection. That is, the nodule slurry can be injected into two, three, five or more reactors and the amount of slurry going into any given reactor need not be equal to the amount going into the others. It has been advantageous, however, that there be no nodule injection into at least the last reactor. That is, each portion of nodules should pass through two stages in progression; therefore, there should be no nodule injection in that last stage. It should be noted that in the pilot plant process there is no nodule injection in the last two stages (107 and 108). Each reactor contains a mechanical impeller to achieve mechanical agitation which disperses the gas and suspends the solids. It has been established that the reaction rate of cuprous ion regeneration is influenced by gas-liquid mass transfer rate of carbon monoxide. The rate is affected primarily by the extent of gas-liquid interfacial area, which is in turn affected by the method used to disperse the gas.

While the nodules are fed to the first four reactors, carbon monoxide is sparged into the bottom of each reactor as required. Preferably the carbon monoxide is sparged into each reactor under pressure so that the pressure in each reactor is between the range of 50–100 lbs/sq. in. The slurry in the fifth and sixth reactors is approximately 3.5 percent solids and the average residence time in the system is twenty minutes per reactor. The slurry overflowing the last reactor is flocculated to enhance settling before entering a clarifier. The clarifier is used to separate the liquid from the solids.

START-UP

The process of the present invention is directed toward a continuous process in which nodules are continuously processed to produce various desirable metals. In order to reach a continuous steady state, the reactor vessels must be loaded with start-up materials. Thus, each of the six reactors are filled with an ammonia-ammonium carbonate solution containing approximately 100 grams per liter total ammonia and between about 15 and 20 grams per liter total carbon dioxide. After the reactors are filled with the ammonia-ammonium carbonate solution, copper metal is added and is partially oxidized. The metal is added as a copper powder and is oxidized to convert some of the copper to cuprous ions. Hydroxyl ions are also produced with the cuprous ions. Enough copper metal is added so that 10 grams per liter copper in solution results. The next step in the start-up procedure is to check the cuprous ion concentration. Thus, the mixture in each reactor is analyzed to make sure that the cuprous ion concentration is at an acceptable level of about 7 grams per liter. If more cuprous ions are needed, this can be accomplished by passing the reducing gas through the bottom of the reactor. The first three reactors have pH loops which consist of a finger pump which pumps the solution to a housing which contains a pH electrode. The pH is then measured in a readout on a control panel. The pH is a valuable control device and can be used to indicate whether or not the carbon dioxide, ammonia or cuprous ions have gone off the specified limits.

After the reactor vessels have been loaded for start-up as set forth above, the manganese nodules are added to the first four reactors. The total rate of feed to the four reactors is about 30 pounds per hour of nodules. As the nodules are being fed into the reactors, carbon monoxide is sparged through the bottom of the reactors under a pressure of about 1–2 psi in at a total rate of about 70 standard cubic foot per hour. At this point it should be noted that the amount of carbon monoxide that is fed into each reactor is controlled by the cuprous ion concentration of the contents of any given reactor. This is determined by analyzing the contents of the reactor periodically. During start-up, this is done every half hour and is continued once an hour while the process is in the steady state.

Approximately 120 gallons per hour of reduction slurry enters the clarifier 110. The solids 112 leave the bottom of the clarifier in the form of a slurry with approximately a 40 percent solids content. The overflow 114 from the clarifier is clear liquid which constitutes the recycle reduction liquor 102. However, after leaving the clarifier, the recycle reduction liquor enters a surge tank (not shown) whereupon it is passed into an ammonia makeup unit 116. Gaseous ammonia and carbon dioxide are sparged into the ammonia makeup unit in order to keep the ammonia and carbon dioxide content of the liquid at a prescribed level. At steady state, that level is approximately 100 grams per liter ammonia and the $CO_2$ content about approximately 25 grams per liter. After leaving the makeup unit, the liquid is pumped by a metering pump through a heat exchanger 118 into the first reactor 103 and the rod mill 100. The heat exchanger removes heat that was generated in process and lowers the temperature of the liquid from about 55° to about 40° C.

OXIDATION AND WASH-LEACH

In the oxidation and wash-leach circuit, the clarifier underflow is combined with second stage wash liquor and the resulting slurry is oxidized with air to convert the cuprous ion in the clarifier underflow to cupric ion to facilitate future processing. The oxidized slurry is then pumped to a countercurrent decantation system (CCD) consisting of seven stages of countercurrent washing units. In the pilot plant, the wash-leach steps are carried out on a batch basis in nine tanks (120 to 128) which are used to simulate a countercurrent wash system. It has been found that a seven reactor countercurrent system is advantageous. However, to simulate a seven reactor system, two extra reactors are necessary because one unit is either being filled or is being emptied. In the wash-leach system, the metal solubilization is completed as the displacement wash process is carried out. Fresh wash liquor 140 is added to the seventh stage of the system as a solution containing 100 grams per liter ammonia and 100 grams per liter carbon dioxide. Liquor is transferred from one tank of the settled slurry every twelve hours to another appropriate tank in the system to affect the counter current washing. The carbon dioxide concentration varies throughout the washing system and exits in the pregnant liquor which contains approximately 65 grams per liter $CO_2$. This decrease in $CO_2$ concentration is due to the fact that the slurry entering the oxidation and wash-leach circuit has a liquor phase which contains only 25 grams per liter $CO_2$. Pregnant liquor 130 containing the metal to be recovered, is decanted from the first wash stage and pumped to a surge tank (not shown). Fresh ammonia solution without metals is added (not shown) to the last solids wash stage 121. The metal values in solution range from approximately 0 in the fresh wash liquor to between 4–8 grams per liter copper and 5–10 grams per liter nickel in the pregnant liquor. Of course, other metal values are also present in the pregnant liquor but nickel and copper are the major metal values of interest.

After the wash-leach step, the pregnant metal bearing liquor is piped off for further processing as is explained below. The second stage wash is recycled back to the oxidation reaction 132. The tailings, which are nothing more than reduced nodules washed of most of their non-ferrous metal values and with the manganese converted to manganese carbonate, are sent to a surge tank (not shown). From the surge tank, they are then pumped to a steam stripping operation where the ammonia and $CO_2$ are driven off. The tailings are then drummed. The ammonia and $CO_2$ obtained in the steam stripper may be recycled.

EXTRACTION AND STEAM STRIPPING

In the extraction and steam stripping circuit, the object is to separate copper, nickel, cobalt and molybdenum from each other and from the pregnant liquor and also recover the ammonia and carbon dioxide in the leach liquor. Pregnant liquor 130 is introduced into mixer 150 along with recycle organic acid 152 from the stripping section. Di (2-ethylhexyl) phosphoric acid (D2EHPA) in kerosene is used. The proportion of organic (D2EHPA) to kerosene is 70% by volume kerosene. The D2EHPA in kerosene and aqueous (pregnant liquor 130) are added to mixer 150 to produce an O/A ratio of one or 50% by volume pregnant liquor to 50% by volume organic. At this time it should be noted that the organic acid may be used undiluted or alternatively may be diluted with any suitable solvent. It is advantageous to use undiluted organic to minimize solvent recycle necessitated by distillation of some solvent during steam stripping.

The high pH (10.6) of the pregnant liquor will result in a partial emulsification of the organic in the mixer 150. After being mixed in mixer 150, the partially emulsified mixture of organic and aqueous is passed through a heat exchanger 154 where the heat available from the barren liquor is used to heat up the feed 160 before going into a distillation column 156 as shown by arrow 160.

Distillation column 156 is the stage of the process where steam stripping of the ammonia and carbon dioxide in the feed 160 occurs. With the ammonia and carbon dioxide removed from the feed, the organic portion of the feed extracts the metal values from the aqueous portion of the feed. The function of the distillation column is to drive off the ammonia and carbon dioxide from the feed 160. There are, of course, many pieces of equipment which can accomplish this function. Merely by way of example, distillation column 156 may be of the double cap type or perforated plate type. Indeed, batch kettle stills may be utilized to drive off or strip the ammonia and carbon dioxide from the feed. Although distillation columns suitable for steam stripping the feed in accordance with the present invention are widely known, a brief description of the operation of distillation column 156 appears below. Distillation column 156 includes a reboiler unit 162. The reboiler unit 162 produces steam which serves as a source of heat for the column 156. The steam shown by arrow 164 condenses at the bottom portion of column 156. The water from the steam is withdrawn from the distillation column 156 at 166 and is reboiled in reboiler 162. The heat generated by the steam causes the ammonia and carbon dioxide to vaporize and travel up the column as is shown by arrow 168. The ammonia and carbon dioxide exit at the top of the distillation column as is shown by arrow 170.

Within the distillation column 156, the pH of the liquid phase will vary from a high value near the top of the column to a value near neutral, i.e. 7, at the bottom of the column. This is the result of the ammonia and carbon dioxide migrating up the column.

At levels within the column 156 where a high pH exists, the liquid phase will consist of an emulsion of organic and aqueous. At this point it should be noted that in distillation columns, the liquid phase collects on the plates 182 and the ammonia and carbon dioxide vaporize from the liquid on the plates. This fact is well understood by those in this art. At some point in the column, the pH falls below a value of about 9 and organic starts to separate from the aqueous phase. This point is easily determined by analysis and once determined, feed 160 is introduced at some point slightly above this point. That is feed 160 is introduced at a point in the column where the pH of the liquid phase is equivalent to that of the feed material. As the pH decreases at lower levels in the column, separation of the liquid from the organic phase is efficient and a two-phase liquid can be withdrawn from the bottom of the column along line 182.

After leaving distillation column 156, the ammonia, carbon dioxide and vaporized organic phase enter a spray condenser 171, where the ammonia, carbon dioxide and vaporized organic are condensed and sent into separator 173. The condensed organic phase is recycled into the distillation column 156 as is shown by arrow 175. The aqueous phase is withdrawn from the separator 173 as is shown by arrow 181. A portion of the aqueous phase 177 is used as a coolant for spray condenser 171. The remainder of the aqueous phase 179 is sent to mixer 174.

Of course, the amount of aqueous stream 181 that is split into streams 177 is determined by the amount of coolant needed to condense vapor stream 170 is spray condenser 171. Substantially all of the ammonia and carbon dioxide is removed during the distillation of feed 160, so that stream 179 when combined with barren liquor stream 190 produces the correct concentration of ammonia and carbon dioxide for recycling in the wash circuit.

In mixing vessel 174, the ammonia and carbon dioxide are combined with the barren liquor 176 from a settler 178 and is recycled to the last stage 127 of the wash circuit as is shown by path 180.

The two-phase liquid 182 is fed to the settler 178 where the liquid and the organic phases are allowed to separate and preheat the feed 160 going into distillation column 156. The barren liquor 176, from which the copper, nickel and cobalt have been extracted, may be treated to recover molybdenum therefrom. One method of recovering molybdenum from the copper, nickel and cobalt barren liquor is to add hydrated lime in stage 188 to precipitate the molybdenum. Barren liquor 190 is then fed into mixer 174 where it is brought back to the proper pH by the addition of ammonia and carbon dioxide along line 179 which are recovered from the top of distillation column 156 in the manner described above.

To improve the loading capacity of the organic before it is introduced into distillation column 156, 50% by volume of the loaded organic 192 is recycled back to the mixer 150 as is shown by path 194. The remainder of the loaded organic 198 is introduced into a stripping circuit 196.

In the stripping circuit, the loaded organic 198 is contacted with dilute sulfuric acid in mixer/settler 200 to strip the cobalt and nickel. Generally, D2EHPA is stripped in a two or three stage counter current stripping circuit to remove the nickel and then in a single stage to remove the copper. In a typical two-stage counter current process a stoichiometric amount of sulfuric acid is added to the stripping liquor to strip the nickel and cobalt. In general, a strip solution containing 14 grams per liter of $H_2SO_4$ at an O/A ratio of 1 is employed. With loaded organic containing 7.2 grams per liter nickel, 5.5 grams per liter copper and 0.2 grams per liter cobalt at the end of two stages of stripping, the aqueous extract will contain about 7.13 grams per liter nickel, 0.2 grams per liter cobalt, and 0.05 grams per liter of copper. The barren organic leaving two stages of nickel and cobalt extraction will contain about 4.95 grams per liter copper, 0.07 grams per liter nickel, and 0.002 grams per liter cobalt.

It should be noted that the concentration of sulfuric acid used in mixer/settler 200 depends upon the nature of the organic extractant. In general, however, the aqueous phase 202 leaving mixer/settler 200 will be at a pH of about 4 and will contain cobalt and nickel. Aqueous phase 202 enters a cobalt and nickel recovery stage 204. Nickel and cobalt is obtained by reduction with hydrogen under pressure at elevated temperature according to the Sherritt Gordon Process referred to above.

The organic phase 206 leaving mixer/settler 200 is fed to a mixer/settler 210 where it is contacted with recycle barren electrolyte 212 from copper electrowinning 214. Recycle barren electrolyte 212 has a sulfuric acid concentration of about 160 g/l and is effective in removing copper from the organic phase. The copper is electrowon in electrowinning circuit 214 in the conventional manner.

The organic phase 220, which has been stripped of metal values, is recycled back to mixer 150. The recycled organic stream 220 is sampled periodically; and, make up organic and solvent (such as kerosene) is added as needed along line 222.

CONCLUSION

By following the teachings of the present invention, it is possible to treat ammoniacal leach liquors to recover the ammonia and carbon dioxide while loading metal values onto an organic extractant. The foregoing is accomplished by adding an amount of organic acid sufficient to extract the metal values that are extractable from the leach liquor into the leach liquor and thereafter driving off the ammonia and carbon dioxide. As the ammonia and carbon dioxide are driven off the metal values in the leach liquor load onto the organic extractant.

The ammoniacal leach liquors treated in accordance with the present invention normally have pH's in excess of 9. Because of these high pH's, organic acids were not considered suitable extractants since they dissolve in solutions having such high pH's. In the practice of the present invention, essentially all of the carbon dioxide and ammonia are driven off resulting in an aqueous phase having pH of about 7. At pH's about 8 the organic acids begin to separate from the aqueous phase and in doing so extract the metal values. It should be noted that the present invention has applicability to any basic leach liquor containing ammonia and carbon dioxide in any amounts. However, as is stated above the process of the present invention can be employed to great advantage in treating ammoniacal leach liquors having pH's above 9. Indeed, such leach liquors normally have a pH within the range of 10-11.

It should also be apparent to those skilled in the art that there are many ways of driving off the ammonia and carbon dioxide. A preferred method for driving off the ammonia and carbon dioxide, however, is to steam strip the ammonia and carbon dioxide in a distillation column. With this technique, a sufficient amount of carbon dioxide and ammonia can be driven off from ammoniacal leach liquors having initial pH's in the vicinity of 10-11 so that the resulting aqueous phase contains little ammonia or carbon dioxide and is at an essentially neutral pH of 7.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for treating a basic aqueous ammoniacal leach liquor having a pH above 9 and containing ammonia, carbon dioxide and metal values selected from the group of copper, nickel, cobalt and mixtures thereof comprising the steps of:
   a. adding an organic acid ion extractant to said aqueous ammoniacal leach liquor;
   b. thereafter driving off a sufficient amount of ammonia and carbon dioxide from said aqueous ammoniacal leach liquor to lower the pH of said aqueous ammoniacal leach liquor to a level where the organic acid is insoluble in said aqueous ammoniacal leach liquor and is capable of extracting metal values therefrom;
   c. separating the loaded organic acid from the aqueous ammoniacal leach liquor; and,
   d. selectively stripping metal values from the loaded acid.

2. The process as set forth in claim 1 wherein the ammonia and carbon dioxide are driven off from said aqueous ammoniacal leach liquor by heating said aqueous ammoniacal leach liquor to vaporize the ammonia and carbon dioxide.

3. The process as set forth in claim 2 wherein an ion extractant selected from the group of carboxylic acids and organophosphoric acids are added in step (a).

4. The process as set forth in claim 2 wherein said ion extractant is an organic acid selected from the group consisting of naphthenic acid, pelargonic acid, 2,2-dimethyl propionic acid, caproic acid, butyric acid, 3,5-dinitro benzoic acid, α-bromolauric acid, di(2-ethylhexyl) phosphoric acid, heptadecylphosphoric acid, dodecylphosphoric acid, di(1-methylheptyl) phosphoric acid, diisooctylphosphoric acid, di(2-ethyl-4-methyl-pentyl) phosphoric acid, di(2-propyl-4-methyl-pentyl) phosphoric acid, octylphenyl phosphoric acid, the isooctyl derivatives of alkyl acid phosphates and the stearyl derivatives of alkyl acid phosphates.

5. The process as set forth in claim 2 wherein said ion extractant is di(2-ethylhexyl) phosphoric acid.

6. The process as set forth in claim 4 wherein in step (b) the ammonia and carbon dioxide are driven up from said aqueous ammoniacal leach liquor by steam stripping the aqueous ammoniacal leach liquor.

7. The process as set forth in claim 4 wherein in step (b) the ammonia and carbon dioxide are driven off from said aqueous ammoniacal leach liquor by steam stripping the aqueous ammoniacal leach liquor in a distillation column.

8. The process as set forth in claim 6 wherein the ammonia and carbon dioxide that is steam stripped is recovered and is recycled.

9. The process as set forth in claim 7 wherein the ammonia and carbon dioxide that is steam stripped in the distillation column is recovered from the distillation column and is recycled.

10. In a process of the type in which metal values selected from the group of copper, nickel, cobalt, molybdenum and mixtures thereof are recovered from a manganese containing ore by introducing the ore into a reaction vessel containing a basic aqueous ammoniacal leach liquor having a pH above 9 and containing ammonia, carbon dioxide and cuprous ions and in which the cuprous ions reduce the manganese oxides in the ore to enable the metal values to be solubilized and in which cuprous ions are continuously regenerated by a reducing gas wherein the improvement comprises:
    a. adding an organic acid ion extractant to the aqueous ammoniacal leach liquor containing solubilized copper, nickel, cobalt and molybdenum;
    b. thereafter driving off a sufficient amount of ammonia and carbon dioxide from said aqueous ammoniacal leach liquor to lower the pH of said aqueous ammoniacal leach liquor to a level where the organic acid is insoluble in said aqueous ammoniacal leach liquor and is capable of extracting metal values therefrom;
    c. separating the loaded organic acid from the aqueous ammoniacal leach liquor; and,
    d. selectively stripping metal values from the loaded acid.

11. The process as set forth in claim 10 wherein the ammonia and carbon dioxide are driven off from said aqueous ammoniacal leach liquor by heating said aqueous ammoniacal leach liquor to vaporize the ammonia and carbon dioxide.

12. The process as set forth in claim 11 wherein an ion extractant selected from the group of carboxylic acids and organophosphoric acids is added in step (a).

13. The process as set forth in claim 11 wherein said ion extractant is an organic acid selected from the group consisting of naphthenic acid, pelargonic acid, 2,2-dimethyl propionic acid, caprice acid, butyric acid, 3,5-dinitro benzoic acid, α-bromolauric acid, di(2- ethylhexyl) phosphoric acid, heptadecylphosphoric acid, dodecylphosphoric acid, di(1-methyl-heptyl) phosphoric acid, diiooctylphosphoric acid, di(2-ethyl-4-methylpentyl) phosphoric acid, di(2-propyl-4-methyl-pentyl) phosphoric acid, octylphenyl phosphoric acid, the isooctyl derivatives of alkyl acid phosphates and the stearyl derivatives of alkyl acid phosphates.

14. The process as set forth in claim 11 wherein said ion extractant is di(2-ethylhexyl) phosphoric acid.

15. The process as set forth in claim 13 wherein in step (b) the ammonia and carbon dioxide are driven off from said aqueous ammoniacal leach liquor by steam stripping the aqueous ammoniacal leach liquor.

16. The process as set forth in claim 13 wherein in step (b) the ammonia and carbon dioxide are driven off from said aqueous ammoniacal leach liquor by steam stripping the aqueous ammoniacal leach liquor in a distillation column.

17. The process as set forth in claim 16 wherein the ammonia and carbon dioxide that is steam stripped is recovered and is recycled.

18. The process as set forth in claim 17 wherein the ammonia and carbon dioxide that is steam stripped in the distillation column is recovered from the distillation column and is recycled.

* * * * *